UNITED STATES PATENT OFFICE.

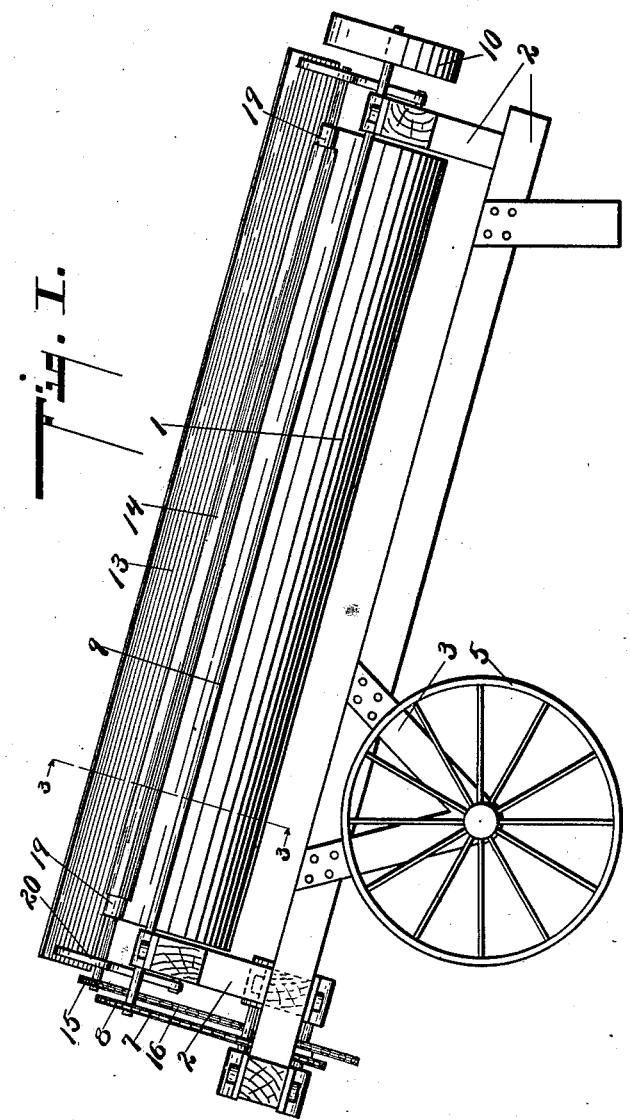

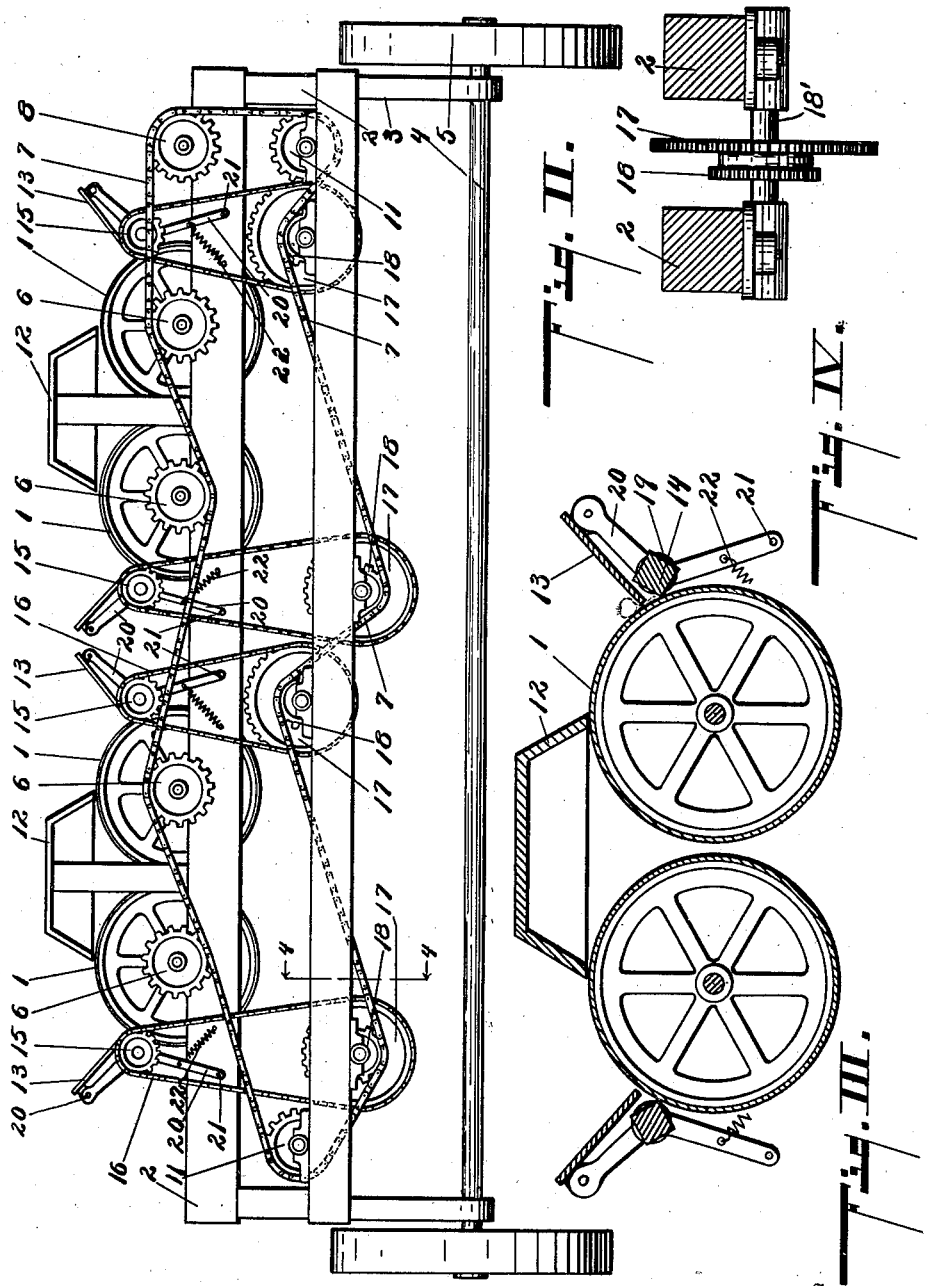

JOHN H. SHIRLEY, OF KALAMAZOO, MICHIGAN, ASSIGNOR TO THE A. M. TODD CO., LIMITED, OF KALAMAZOO, MICHIGAN, A COPARTNERSHIP.

ONION OR VEGETABLE TOPPING MACHINE.

1,026,776.  Specification of Letters Patent.  Patented May 21, 1912.

Application filed September 20, 1910. Serial No. 582,853.

*To all whom it may concern:*

Be it known that I, JOHN H. SHIRLEY, a citizen of the United States, residing at Kalamazoo, county of Kalamazoo, State of Michigan, have invented certain new and useful Improvements in Onion or Vegetable Topping Machines, of which the following is a specification.

This invention relates to improvements in onion or vegetable topping machines.

It relates particularly to improvements on the vegetable topping machine illustrated in Patent No. 869,816 of October 29, 1907, to Arthur E. Vrooman.

It is a particular object of this invention to improve the driving gear mechanism for such a vegetable or onion topping machine.

I accomplish the objects of my invention by the devices and means described in the following specification.

The invention is clearly defined and pointed out in the claims.

A structure which is a preferred embodiment of my invention is clearly illustrated in the accompanying drawing, forming a part of this specification, in which:

Figure 1 is a side elevation view of an onion or vegetable topping machine embodying the features of my invention. Fig. 2 is an end view of the same, showing the method of coupling up the sprocket gears. Fig. 3 is a detail cross sectional view, taken on a line corresponding to line 3—3 of Fig. 1, showing the feed cylinders and angular cutter bars and the supports and guards therefor. Fig. 4 is a detail sectional view, taken on a line corresponding to line 4—4 of Fig. 2, showing the details of the boring supports for the gears.

In the drawing, similar numerals of reference refer to similar parts throughout the several views and the sectional views are taken looking in the direction of the little arrows at the ends of the section lines.

Considering the numerals of reference, the main feed rolls 1 are supported on the frame 2, which is provided with brackets 3 in which are journaled the axle 4, on which are fixed the carrying wheels 5. Each feed roll 1 is driven by a sprocket gear 6, which is driven by the sprocket chain 7, which is so disposed thereon as to drive each of said feed rolls respectively toward their coacting cutter bars. The said sprocket chain 7 is driven by the gear 8 and passes over idle gears 11, in order that it may take the proper course to drive the remaining portions of the machine. The driving sprocket wheel 8 is on shaft 9, which is driven by the pulley 10, as clearly appears in Fig. 1, such shaft 9 running parallel with the feed rolls 1.

Guards 12 are disposed between each pair of feed rolls and coöperate with the same to form hoppers. An adjustable hopper side or wall 13 coöperates with each feed roll, and is pivotally supported on swinging arms 20, which swinging arms are secured to the ends of the frame on pivots 21.

Square or angular revoluble cutter bars 14 are supported on the arms 20 by suitable journals, beneath the hopper sides or walls 13, and are held yieldingly toward the feed cylinders 1 by springs 22 acting on the arms 20. The ends of the cutter bars are provided with collars 19, and are driven by sprocket wheels 15 at their front ends. A separate sprocket chain 16 is provided for each of these bars, and is driven by sprocket wheel 17. The sprocket wheel 17 is on the same shaft as the driven sprocket wheel 18, both being supported on the shaft 18', as clearly appears in Fig. 4. As these shafts 18' are disposed below the cutter bars and as each chain 16 rotates its said cutter bar, so that the top side thereof moves toward the feed rolls or cylinders 1, it will be seen that the tendency of the driving chain is to urge the cutter bars toward the feed roll and thereby effectively nip or cut off the tops of onions or other vegetables that may be in the hopper above, thus permitting them to roll rapidly down the machine and be discharged at the lower end thereof.

The main driving sprocket chain 7 is passed over the various gears 18, and arranged in such manner as to actuate the sprocket chains as I have indicated. This arrangement, it will be noted, applies the power in such a way that the sprockets and the cutter bars are urged toward the feed cylinders, thus making the use of very small springs sufficient to preserve the contact, and no springs at all will be needed for much of the work.

The machine I show has four feed cylinders. My invention is applicable to a "single" machine, or to a machine having any desired number of feed cylinders.

Having thus described my invention, what

I claim as new and desire to secure by Letters Patent is:

1. In an onion topping machine, the combination of a suitable frame; a feed roll; a rotatable cutter bar coacting with said feed roll, the same being connected to rotate toward each other; a pivoted support for said cutter bar pivoted beneath the same; a guard plate for the said cutter bar; means for driving the feed roll; and an independent sprocket gear disposed beneath the cutter bar with suitable sprocket chain for driving the said cutter bar toward the feed roll and acting downwardly between the pivoted support and the axis of said feed roll, coöperating for the purpose specified.

2. In an onion topping machine, the combination of a suitable frame; a feed roll; a rotatable cutter bar coacting with said feed roll, the same rotating toward each other; a pivoted support for said cutter bar pivoted beneath the same; means for driving the feed roll; and an independent sprocket and chain disposed beneath the cutter bar with suitable sprocket chain for driving the said cutter bar toward the feed roll and acting downwardly between the pivoted support and the axis of said feed roll, coöperating for the purpose specified.

3. In an onion topping machine, the combination of a suitable frame; a feed roll; a rotatable cutter bar coacting with said feed roll, the same rotating toward each other; a pivoted support for said cutter bar pivoted beneath the same; means for driving the feed roll; and flexible driving means disposed beneath said cutter bar for rotating said cutter bar toward the feed roll and permitting a yielding of the same, coacting as specified.

In witness whereof, I have hereunto set my hand and seal in the presence of two witnesses.

JOHN H. SHIRLEY. [L. S.]

Witnesses:
 J. F. CAMPBELL,
 GENEVIEVE LICH.

---

Copies of this patent may be obtained for five cents each, by addressing the "Commissioner of Patents, Washington, D. C."